(12) United States Patent
Harris et al.

(10) Patent No.: US 10,891,672 B2
(45) Date of Patent: Jan. 12, 2021

(54) SYSTEMS AND METHODS FOR INTERACTIVE DECISION-MAKING

(71) Applicant: MasterCard International Incorporated, Purchase, NY (US)

(72) Inventors: Matthew Harris, St. Peters, MO (US); Pia Maenpaa, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 720 days.

(21) Appl. No.: 15/217,091

(22) Filed: Jul. 22, 2016

(65) Prior Publication Data

US 2018/0025404 A1    Jan. 25, 2018

(51) Int. Cl.
G06Q 30/00    (2012.01)
G06Q 30/06    (2012.01)

(52) U.S. Cl.
CPC ..... G06Q 30/0625 (2013.01); G06Q 30/0635 (2013.01)

(58) Field of Classification Search
CPC ................... G06Q 30/625; G06Q 30/0635
See application file for complete search history.

(56) References Cited

U.S. PATENT DOCUMENTS

| | | | |
|---|---|---|---|
| 6,873,967 B1 * | 3/2005 | Kalagnanam ......... | G06Q 10/06 705/26.41 |
| 8,086,500 B2 | 12/2011 | Lutnick et al. | |
| 2003/0023499 A1 | 1/2003 | Das et al. | |
| 2003/0046170 A1 | 3/2003 | Lutnick et al. | |
| 2008/0288362 A1 * | 11/2008 | King ..................... | G06Q 30/00 705/26 |
| 2009/0216659 A1 | 8/2009 | Parker | |
| 2012/0265635 A1 | 10/2012 | Forsblom | |
| 2012/0330999 A1 | 12/2012 | Lutnick et al. | |

(Continued)

FOREIGN PATENT DOCUMENTS

WO    WO-03021383 A2 *    3/2003    ............. G06Q 10/06

OTHER PUBLICATIONS

P. K. Kannan, A. -. Chang and A. B. Whinston, "Wireless commerce: marketing issues and possibilities," Proceedings of the 34th Annual Hawaii International Conference on System Sciences, Maui, HI, USA, 2001, pp. 6 pp.-, doi: 10.1109/HICSS.2001.927209. (Year: 2001).*

*Primary Examiner* — Anand R Loharikar
(74) *Attorney, Agent, or Firm* — Armstrong Teasdale LLP

(57) ABSTRACT

A system for facilitating a purchasing decision is provided. The system includes a decision-making computing device configured to obtain purchase criteria, to apply the purchase criteria to a list of available purchases to determine a list of candidate purchases, and to determine a final purchase decision from the list of candidate purchases. The decision-making computing device determines the final purchase decision, at least in part, based on user input provided by a user of a user computing device. The user input is provided through an interactive decider configured to gamify the purchasing decision process, at least in part, by executing one or more interactive modules which may be in the form of a game, an animation, a simulation, and the like. If a user confirms a final purchase decision, the decision-making computing device may then initiate a purchasing process.

12 Claims, 3 Drawing Sheets

(56) References Cited

U.S. PATENT DOCUMENTS

| | | |
|---|---|---|
| 2013/0317941 A1 | 11/2013 | Stoll et al. |
| 2014/0012667 A1 | 1/2014 | Davidson et al. |
| 2015/0024840 A1 | 1/2015 | Poon et al. |
| 2015/0242911 A1 | 8/2015 | Zises |
| 2015/0242931 A1 | 8/2015 | Stoll et al. |
| 2015/0310530 A1 | 10/2015 | Zhang et al. |
| 2016/0071349 A1 | 3/2016 | Tambaku |

* cited by examiner

SYSTEMS AND METHODS FOR INTERACTIVE DECISION-MAKING

BACKGROUND OF THE DISCLOSURE

This disclosure relates generally to facilitating consumer purchasing decisions, and more specifically to systems and methods that include a decision-making computing device that makes purchasing decisions from a plurality of purchasing options.

The Internet provides consumers with unprecedented access to product information and purchasing opportunities. This increased freedom presumably leads to more and better informed purchasing decisions. However, a consumer may feel overwhelmed by the sheer quantity of available options or may lack the desire or time to undertake a detailed analysis of all available options. Ultimately, an excess of choices may frustrate a consumer, leading him or her to opt out of a purchase entirely and causing a merchant to lose a sale.

In a related situation, the act of making a purchasing decision on behalf of a group may also be frustrated by trying to come to a decision that satisfies each member of the group. Common examples of such situations include when a group is trying to decide on a restaurant for dinner, a movie to watch, or an activity in which to engage. Taking into account each group members preferences significantly complicates the decision-making process, potentially grinding the decision-making process to a halt. Again, this may lead to frustration for consumers and lost revenues for merchants.

In light of the above, a system and method is needed that facilitate consumer purchasing decisions by taking into account selection and purchase criteria of one or more consumers.

BRIEF DESCRIPTION OF THE DISCLOSURE

In one embodiment, a decision-making computing device for facilitating a purchasing decision by a user of a user computing device is provided. The decision-making computing device includes one or more processors in communication with one or more memory devices, and is configured to: receive, from the user computing device, a request to initiate a decision-making process; determine one or more purchase criteria corresponding to characteristics of the purchasing decision; retrieve available purchase information corresponding to one or more purchases available from a merchant; apply the purchase criteria to the available purchase information to determine one or more candidate purchases; determine a final purchase decision from among the one or more candidate purchases based, at least in part, on user input provided to an interactive decider; transmit, to the user computing device, the final purchase decision; receive, from the user computing device, a confirmation to initiate a purchase of the final purchase decision; and initiate, in response to receiving the confirmation, the purchase of the final purchase decision.

In another embodiment, a computer-implemented method for facilitating a purchasing decision by a user of a user computing device is provided. The method is implemented using a decision-making computing device in communication with one or more memory devices, and includes: receiving, from the user computing device, a request to initiate a decision-making process; determining one or more purchase criteria corresponding to characteristics of the purchasing decision; retrieving, by the decision-making computing device, available purchase information corresponding to one or more purchases available from a merchant; applying the purchase criteria to the available purchase information to determine one or more candidate purchases; determining a final purchase decision from among the one or more candidate purchases based, at least in part, on user input provided to an interactive decider; transmitting, to the user computing device, the final purchase decision; receiving, from the user computing device, a confirmation to initiate a purchase of the final purchase decision; and initiating, in response to receiving the confirmation, the purchase of the final purchase decision.

In yet another embodiment, a non-transitory computer-readable storage media having computer-executable instructions embodied thereon is provided. When executed by at least one processor, the computer-executable instructions cause the processor to: receive, from a user computing device, a request to initiate a decision-making process corresponding to a purchasing decision; determine one or more purchase criteria corresponding to characteristics of the purchasing decision; retrieve available purchase information corresponding to one or more purchases available from a merchant; apply the purchase criteria to the available purchase information to determine one or more candidate purchases; determine a final purchase decision from among the one or more candidate purchases based, at least in part, on user input provided to an interactive decider; transmit, to the user computing device, the final purchase decision; receive, from the user computing device, a confirmation to initiate a purchase of the final purchase decision; and initiate, in response to receiving the confirmation, the purchase of the final purchase decision.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
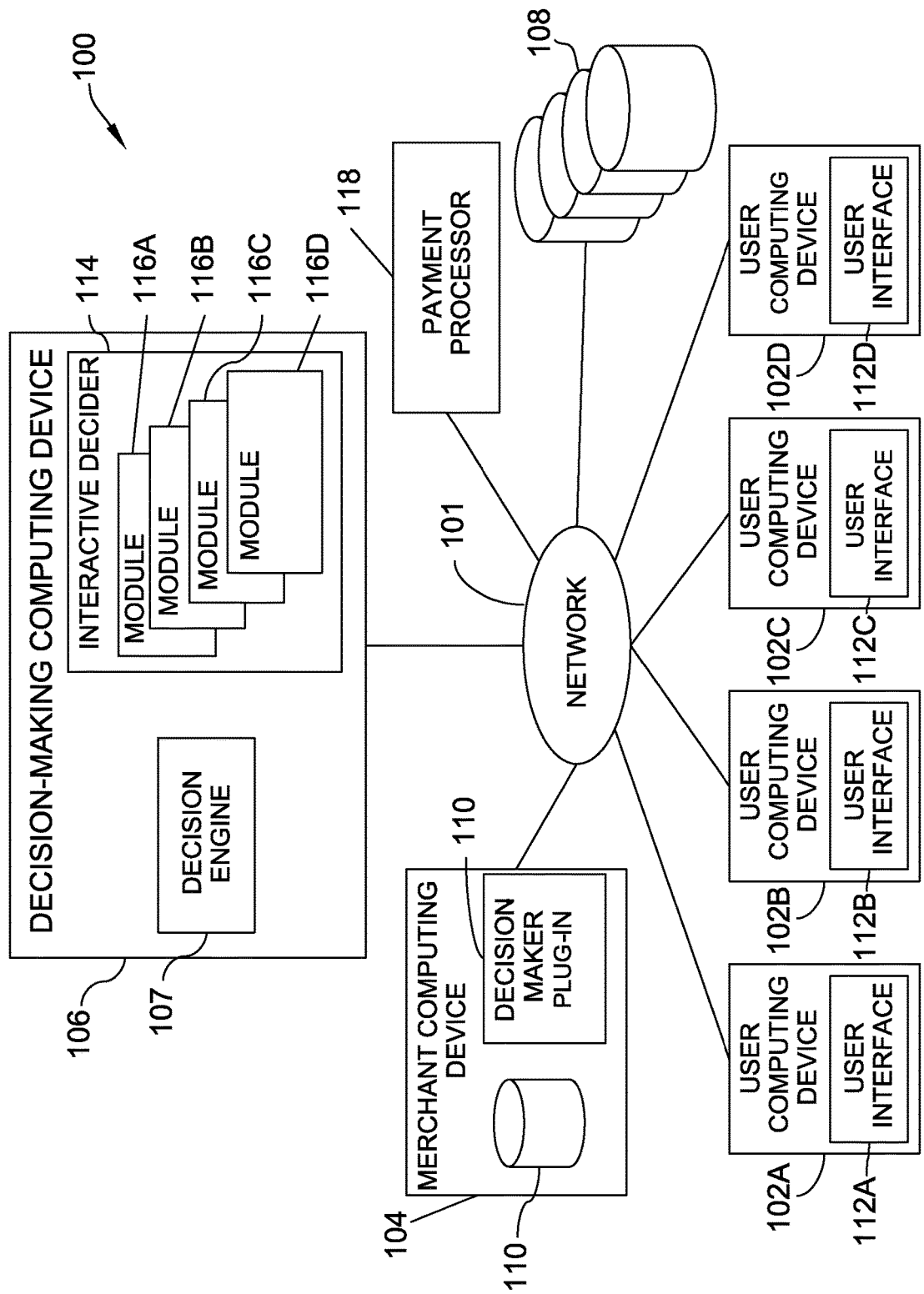
FIG. 1 is a block diagram of an example interactive decision-making system according to one embodiment disclosed herein.

The systems and methods described herein relate to an interactive decision-making system for facilitating consumer purchasing decisions. The interactive decision-making computing system may operate in conjunction with a website, a mobile application, and the like accessible by a user computing device such as a laptop computer, a tablet, a mobile phone, a desktop computer, a wearable computer, or a similar computing device.

Embodiments of the interactive decision-making system include a decision-making computing device generally configured to obtain purchase criteria, determine candidate purchases based on the purchase criteria, and generate a final purchase decision from the candidate purchases. Once the decision-making computing device generates a final purchase decision, the decision-making computing device may cause the final purchase decision to be presented to the user who may opt to proceed with purchasing the final purchase decision.

The term "purchase criteria" as used herein denotes any aspect of a purchase that may be relevant to a purchasing decision and should not be limited to any specific examples of purchase criteria described within this disclosure. Purchase criteria may vary depending on the nature of the goods and services to be purchased. In certain embodiments, purchase criteria may include properties of the purchase itself. For example, if a user wishes to make a decision regarding a purchase of clothing, purchase criteria may include the particular type of clothing to be purchased, size, color, price, style, and the like. Purchase criteria may also include characteristics of a merchant from which the final purchase decision is to be made. For example, purchase criteria may include the proximity of the merchant to the user, inventory levels of the merchant, and specials sales or promotions offered by the merchant. Purchase criteria may also include characteristics of a user of the interactive decision-making system such as the user's current mood or the user's current location. Purchase criteria may include either strict requirements or ranges of acceptable values. For example, a user may specify that they would like to make a decision regarding the purchase of a shirt (a strict requirement purchase criteria) with a price range of between fifteen and thirty dollars (a range purchase criteria).

In certain embodiments, a merchant may influence the type of purchase criteria that may be applied in a particular decision. For example, in addition to purchase criteria directed to individual goods or services, a merchant website may permit a user to select from additional categories directed to bundled products or services such that the merchant may upsell to the user. Such categories may be used to encourage the user to pursue a decision directed to more complete offerings from the merchant. For example, restaurants may direct users to full meals instead of individual dishes, clothing merchants may direct users to complete outfits instead of individual pieces of clothing, and travel services may direct users to full trip itineraries instead of individual travel bookings. Merchants may also track or otherwise obtain data corresponding to purchase criteria applied to decisions made on behalf of users to identify preferences for one or more users.

Purchase criteria may be obtained in various ways. In certain embodiments, purchase criteria may be specific to a user of an interactive decision-making system. For example, the user may provide purchase criteria to the decision-making computing device while shopping online. The decision-making computing device of the interactive decision-making system may also obtain purchase criteria from one or more social networking accounts of the user, from a user's payment card purchase history, and from past approvals or rejections of final purchasing decisions presented to the user by the interactive decision-making system. Purchase criteria to make a decision for a primary user may also be obtained from users of the interactive decision-making system other than the primary user. For example, if a primary user is using the interactive decision-making system to make a decision on behalf of a group in which members of the group are also users of the interactive decision-making system, the decision-making computing device may obtain purchase criteria from any or all users within the group to make a decision on behalf of the primary user. The decision-making computing device may also obtain purchase criteria from sources other than users of the interactive decision-making system Such data sources may include websites such as merchant websites, review websites, and news websites, and databases such as market research databases and payment card transaction databases.

After the decision-making computing device obtains purchase criteria, it applies the purchase criteria to a set of purchases available from one or more merchants to determine a set of candidate purchases satisfying the purchase criteria. For example, if a user is using the interactive decision-making system to decide on a movie to watch and has provided movie-related purchase criteria (such as movie genre, actors in the movie, movie rating, whether the movie has received generally positive reviews, etc.), the decision-making computing device may apply the purchase criteria to a list of movies currently playing in theaters to determine a list of one or more candidate purchases in the form of tickets meeting the purchase criteria.

After the decision-making computing device determines a list of candidate purchases, an interactive decider facilitates selection of one of the candidate purchases as a final purchase decision. The interactive decider includes one or more interactive modules for receiving input from a user and displaying decision-related information received by the interactive decider from the decision-making computing device. The complexity and level of interactivity of a given interactive module may vary in different embodiments. For example, in some embodiments relatively simple modules may require only that the user press a button (or a virtual button) or perform a similar basic action to initiate the decision-making process. In other embodiments, more complex interactive modules may take the form of an interactive game requiring multiple user inputs that guide, in whole or in part, the selection of a final purchase decision by the decision-making computing device. The interactive decider and interactive modules preferably make use of text, animations, video, sound, various input methods, and the like to increase the entertainment value of using the interactive decision-making system.

The incorporation of interactive games, animations, videos, and the like into the decision-making process is generally referred to herein as the "gamification" of the decision-making process. Gamification is intended to make tasks, such as making purchasing decisions, more entertaining for the user. Through gamification, tasks that may be tedious, time-consuming, difficult, or otherwise unenjoyable may be made more entertaining leading to improved user attention and an increased likelihood that a user will be more willing to perform the task again. In the case of purchasing decisions, for example, users of a gamified purchasing decision process may be more likely to see a purchasing decision through to completion (i.e., to actual purchase of a good or service) and to make additional purchasing decisions in the future. In embodiments of decision-making systems in accordance with this disclosure, gamification is achieved through the interactive modules of the interactive decider.

After the decision-making computing device determines a final purchase decision, the final purchase decision is presented to the user and the user is given the option to proceed with purchasing the final purchase decision. If the user chooses to proceed, the decision-making computing device may initiate a purchase of the final purchase decision by populating an electronic shopping cart or shopping basket with the final purchase decision, importing payment information of the user into a purchase form, or taking other steps in furtherance of completing a purchase of the final purchase decision.

The process of obtaining purchase criteria, identifying candidate purchases, determining a final purchasing decision via a gamified decision-making process, and presenting the final purchasing decision to a user for approval, may be implemented in various ways using decision-making systems according to this disclosure. To the extent specific examples of purchasing criteria and interactive modules are described herein, for example, such examples are intended to be merely illustrative and should not be seen as limiting the scope of this disclosure.

In a first example, an interactive decision-making system in accordance with this disclosure may be used to assist a user in purchasing clothing. An interactive decider may be incorporated into a website of a clothing merchant accessible by a user computing device. For example, the interactive decider may be incorporated into the merchant's website via an applet, a plug-in, a browser-based tool, and the like, and may be accessible by the user by clicking a link, clicking a virtual button, or activating a different kind of website control. In response to activating the interactive decider, the user may be prompted to provide one or more purchasing criteria including, but not limited to, a type of clothing item, a preferred color, a price range, and a clothing style. Based on the purchase criteria obtained from the user, an interactive decision-making computing device may determine a list of candidate purchases of the clothing merchant that meet or substantially conform to the purchase criteria provided by the user and may determine a final purchase decision from the list of candidate purchases. In the meantime, the user may be presented with an interactive module of the interactive decider, the interactive module providing a gamified representation of the decision-making process. In this example, the interactive module may include a virtual "Decide" button that, when activated by the user, plays an animation of a coin flip. Upon completion of the coin-flip animation, the user is presented with the final purchase decision and given the opportunity to add the final purchase decision to an electronic shopping cart.

In a second example, a user may use the decision-making computing device to purchase movie tickets. Similar to the previous example, the decision-making process may be facilitated by an interactive decider incorporated into a movie theater website. Upon activation of the interactive decider, the user may be prompted to provide credentials for one or more social networking accounts along with permission for the decision-making computing device to access information stored in the one or more social networking accounts. If permission is given, the decision-making computing device may access information stored in the user's social networking accounts and derive purchase criteria therefrom. For example, if a user includes a list of favorite movies on their social networking account, the decision-making computing device may obtain the list of favorite movies and cross-reference the list of favorite movies with a database of other external data source of movie information. By doing so, the decision-making computing device may obtain information about the movies listed on the user's social networking account (such as genres, actors, directors, themes, and the like) and use that information to generate purchase criteria. For example, the decision-making computing device may identify that a first portion of movies listed on the user's social networking computing device are by a particular director, that a second portion of movies include a specific actor, and that a third portion of movies are science fiction movies that take place in a post-apocalyptic setting. Accordingly, the decision-making computing device may determine which movies for which the user may purchase tickets are made by the director, star the actor, or fit the science fiction theme.

If the decision-making computing device identifies multiple movies that meet one or more of the purchase criteria, the movies may be considered candidate purchases and the decision-making computing device may cause the interactive decider to run an interactive module in which the user chooses from the candidate purchases. For example, the interactive module may present the user with a plurality of suitcases with each suitcase representing one of the candidate purchase movies. The user may then select one of the suitcases to eliminate, triggering an animation in which the suitcase is opened to reveal the movie it contained. This process may be repeated until one suitcase remains, representing the final purchase decision that is then presented to the user for confirmation.

In another example, a user may be part of a group and may wish to make a purchasing decision on behalf of the group such as deciding on a restaurant for dinner. A decision-making system in accordance with this disclosure may include a mobile application that may be installed and run on a user computing device such as a tablet or smart phone. When initiated, the mobile application may ask the user whether they are making an individual or group decision. To the extent the user selects a group decision, the mobile application may ask the user to identify members of the group. For example, the mobile application may permit the user to identify other users of the mobile application as and may permit the user to any of the other users as members of the group. In this example, the decision-making computing device may obtain purchase criteria by examining past payment card purchases by members of the group. For example, the decision-making computing device may access payment card transaction histories of group members, identify transactions corresponding to restaurants, and determine trends in restaurant spending habits of the group members. Such trends may then be used as purchase criteria in the decision making process. For example, the decision-making computing device may determine that one user tends to make purchases at fine Italian restaurants while another tends to patronize fast casual restaurants specializing in soups and sandwiches. Based on these spending habits, the decision-making computing device may determine purchase criteria that may satisfy some or all group members. In the previous example, for instance, the decision-making computing device may identify casual restaurants specializing in Italian sandwiches or mid-range Italian restaurants known for their soups. In other embodiments, the decision-making computing device may obtain purchase criteria from other members of the group through the user computing devices of the other group members. For example, initiating a group decision may cause the devices of other group members to request information from the other group members such as by asking questions of the other group members, taking a vote of the other group members, and the like.

The decision-making computing device may also take into account the mood of the group. For example, the user may indicate that the group is feeling "adventurous" and the decision-making computing device may respond by identifying restaurants that may be slightly outside the identified preferences of group members, i.e., the decision-making computing device may treat the purchase criteria as guidelines as opposed to strict requirements. The user may also indicate that the group is feeling "celebratory" or "excited"

and, as a result, the decision-making computing device may include an exciting or social atmosphere as purchase criteria.

The decision-making computing device may also obtain location information from the user and consider proximity to the user as purchase criteria. For example by retrieving geolocation data from the user's computing device, the decision-making computing device may determine the user's current location and may limit candidate restaurants to those within walking distance or within a short drive.

In certain embodiments, the decision-making computing device may also use items already selected for purchase by the user as purchase criteria. For example, a user may select a main course of a meal and the decision-making computing device may use characteristics of the main course as purchase criteria for deciding on an appetizer, a wine, a dessert, and the like. In another example, a user may select a shirt for purchase and the decision-making computing device may use the style, the color, the price, or any similar characteristics of the selected shirt as purchase criteria for purchasing decisions for other clothing items or accessories.

After taking into account all purchase criteria, the user may be prompted to select one of a plurality of interactive modules to use in facilitating the decision-making process. For example, the user may be asked if they would like to run the previously described coin flip and suitcase modules or a "magic 8-ball" module. The magic 8-ball module may be a simulation of a physical magic 8-ball and make use of a mobile device's accelerometer or similar sensor. Physical magic 8-balls are generally used by flipping the magic 8-ball, shaking the magic 8-ball, and then turning the magic 8-ball back over to reveal a fortune or other outcome. Similarly, the magic 8-ball module may require the user to flip their device over, shake their device, and then flip their device back over to reveal a final restaurant decision determined by the decision-making computing device.

In certain embodiments, interactive modules may permit participation in the decision-making process by multiple group members and may result in the decision-making computing device giving more weight to purchase criteria of certain group members in arriving at a final purchase decision. For example, an interactive module may ask for each group member to roll a die, pick a card, or participate in a similar game that may be used to assign a score or rank to members of the group. The purchase criteria of group members with higher scores may then be given more weight or precedence over those of lower scoring group members. In another example, the decision-making process may include a bidding system that permits group members to submit bids in order to have the final purchase decision be more in accordance with their individual preferences. For example, each participating group member may be asked to bid a certain amount or percentage of the final purchase decision price in order to sway the final purchase decision in his or her favor. To the extent a group member "wins" the bidding process (e.g., by being the highest bidder), the decision-making computing device may give more weight to purchase criteria associated with the winning group member (including completely disregarding the purchase criteria of some or all other group members) when arriving at a final purchase decision and may assign a high proportion of the purchase price of the final purchase decision to the winning group member based on to his or her bid.

Once a final decision has been made, the user may confirm the decision and the decision-making computing device may cause the user's device to open a reservation form or to initiate a call to the restaurant to make a reservation or to add menu items to a shopping cart. If the user indicates that the group would like their food to go, the decision-making computing device may cause the user's computing device to open a menu and order form of the restaurant with which the user may input an order.

Example Interactive Decision-Making System

FIG. 1 depicts an interactive decision-making system 100 according to one embodiment of the present disclosure. Interactive decision-making system 100 includes one or more user computing devices 102A-D in communication over network 101 with a merchant computing device 104. Merchant computing device 104, a decision-making computing device 106, and a payment processor 118 are further communicatively coupled over network 101. Network 101 is intended merely to illustrate communication pathways between devices in interactive decision-making systems in accordance with this disclosure. Accordingly, any devices discussed herein as being communicatively coupled over a network may be communicatively coupled directly to each other or may be integrated into the same computing device.

Each of user computing devices 102A-D may be, but is not limited to, a laptop computer, a mobile phone, a desktop computer, a tablet, a personal data assistant (PDA), a wearable computing device, and the like. Generally, user computing devices 102A-D may be used to communicate with merchant computing device 104 over a network, such as the Internet. To do so, each of user computing devices 102A-D may include a communication interface configured to transmit and receive data over a network. User computing devices 102A-D may further include an Internet browser, a mobile application, or similar software for providing a user interface for displaying and inputting information exchanged between one of user computing devices 102A-D and merchant computing device 104.

Merchant computing device 104 generally provides information regarding potential purchasing options to user computing devices 102A-D and permits users of user computing devices 102A-D to make purchases. For example, merchant computing device 104 may host a merchant website for sale of products and services available from a merchant and may permit a user to purchase any available products and services by providing payment information, such as credit card information.

Merchant computing device 104 may host a merchant website or otherwise contain information regarding goods or services for purchase from one or more merchants. For example, merchant computing device 104 may aggregate information regarding goods and services from multiple merchants. Moreover, systems and methods in accordance with this disclosure may include more than one merchant computing device, each merchant computing device being accessible to a decision-making computing device, such as decision-making computing device 106. Accordingly, to the extent this disclosure refers to purchasing decisions related to goods or services offered by "a merchant", any such references should be construed to include goods or services offered by one or more merchants. For example, if a user seeks to make a decision regarding dinner options, decision-making computing devices in accordance with this disclosure may include information from multiple restaurants in arriving at a final decision.

To facilitate interaction with merchant computing device 104 and decision-making computing device 106, user computing devices 102A-D may include user interfaces 112A-D. User interfaces 112A-D generally permit input of data, information, or commands from users of user computing devices 102A-D for transmission to merchant computing device 104 and decision-making computing device 106. User interfaces 112A-D may also present data and information received from merchant computing device 104 and decision-making computing device 106 to users of user computing devices 102A-D. User interfaces 112A-D may be implemented in various ways including, but not limited to, standalone software or mobile applications installed on user computing devices 102A-D, webpages received from merchant computing device 104 or decision-making computing device 106 and rendered by an Internet browser installed on user computing devices 102A-D, and the like.

Although merchant computing device 104 may provide information regarding available purchases from a merchant to a user via user computing devices 102A-D, a user may have difficulty in determining which of a plurality of the available purchases to actually purchase. To facilitate making a purchasing decision, decision-making computing device 106 is generally configured to obtain or receive purchase criteria from a user or other sources, to determine a list of candidate purchases available from the merchant, and to make a final purchase decision from the candidate purchases for consideration by the user.

Interactive decision-making system 100 generally includes an interactive decider 114, which provides a graphical interface to user computing devices configured to receive data from and to provide and/or present decision-related data to user computing devices 102A-D. Interactive decider 114 includes one or more interactive modules 116A-D configured to present the decision-making process to users in the form of interactive games, animations, activities, simulations, and the like. Presentation of the decision-making process to a user in such an interactive manner is referred to herein as "gamification" of the decision-making process. During operation of an interactive module, interactive decider 114 receives user input from user computing devices 102A-D, communicates user input to decision engine 107, receives decision-related data such as candidate purchases such as final purchase decisions from decision engine 107, and provides decision-related data to user computing devices directly or via interactive modules 116A-D.

Interactive decider 114 may be configured to run in whole or in part on any of user computing devices 102A-D, merchant computing device 104, and decision-making computing device 106. For example, in the embodiment of FIG. 1, interactive decider 114 is incorporated into decision-making computing device 106. In other embodiments, interactive decider 114 may be implemented as software directly installed on user computing devices 102A-D. In still other embodiments, interactive decider 114 may be configured to run on merchant computing device 104 and to be accessible through a merchant website via an Internet browser.

Decision-making computing device 106 further includes a decision engine 107 configured to determine purchase criteria, identify candidate purchases that meet the purchase criteria from the purchases available from a merchant, and determine a final purchase decision from the candidate purchases. As described in further detail later in this disclosure, purchase criteria may be provided to or obtained by the decision engine 107 in various ways including by receiving input or data from user computing devices 102A-D or by accessing one or more remote data sources 108.

In embodiments in which interactive decider 114 is incorporated into decision-making computing device 106, interactive decider 114 may be accessed by a user in various ways. In some embodiments, interactive decider 114 may be directly accessed by one of user computing devices 102A-D. For example, user computing devices 102A-D may include an application or similar software that enables user computing devices 102A-D to send data to and receive data from interactive decider 114 over network 101. During operation, a user may use the application or software to provide information and inputs to decision-making computing device 106. Decision-making computing device 106 may also transmit data to user computing devices 102A-D including, but not limited to, data related to candidate purchases, data related to final purchase decisions determined by decision engine 107, and graphical data corresponding to modules 116A-D.

In other embodiments in which interactive decider 114 is incorporated into decision-making computing device 106, interactive decider 114 may be accessed via a website hosted by merchant computing device 104. Merchant computing device 104 may include software, generally referred to herein as decision-maker plug-in 120, to facilitate communication between interactive decider 114 and user computing devices 102A-D. Decision-maker plug-in 120 may include software configured to present decision-making functionality to user computing devices 102A-D and to communicate with decision-making computing device 106. Such software may be installed on merchant computing device 104 and be configured to provide decision-making functionality to a user who accesses the merchant website. Decision-maker plug-in 120 may include controls for conducting a decision-making process that may be embedded into a website hosted by merchant computing device 104. Such controls may include an initiating button (e.g., a "Help Me Decide" button) that, when clicked, starts the decision-making process. Controls may also include a module player configured to receive and display data from decision-making computing device 106 and to receive input from a user during the execution of one of modules 116A-D.

Decision-maker plug-in 120 may also include software configured to facilitate communication between merchant computing device 104 and decision-making computing device 106. For example, decision-maker plug-in 120 may include transmitter and receiver software that, when installed, permits merchant computing device 104 to send to and receive data from decision-making computing device 106. In certain instances, data transmitted from merchant computing device 104 to decision-making computing device 106 may include inputs or other data received from one of user computing devices 102A-D.

Data regarding available purchases from a merchant may be stored in a merchant purchase database 110 accessible by decision engine 107. Accordingly, after decision engine 107 obtains purchase criteria, decision engine 107 may apply the purchase criteria to data in the merchant purchase database 110 to determine a list of candidate purchases that meet the purchase criteria. In decision-making system 100, merchant purchase database 110 is maintained in merchant computing device 104; however, merchant computing device 104 may be maintained in other locations including as part of decision computing device 106. In certain embodiments, data in the merchant purchase database 110 may be transmitted from merchant computing device 104 to decision-making computing device 106 by transmitter software included in decision-maker plug-in 120.

The purchase criteria may be applied to the merchant purchase database 110 in various ways. For example, decision engine 107 may develop one or more filters based on the purchase criteria and apply the filters to data contained in merchant purchase database 110 to identify candidate purchases. Similarly, decision engine 107 may develop one or more queries or logical tests that may be applied to data contained in merchant purchase database 110.

In determining whether available purchases qualify as candidate purchases, decision engine 107 may require varying levels of conformity for different purchase criteria. For example, the decision engine 107 may consider certain purchase criteria as strict requirements of candidate purchases while other purchase criteria may be considered guidelines that need not be strictly met by an available purchase to be considered a candidate purchase. For example, if a user is trying to make a decision regarding purchase of a new shirt, decision engine 107 may include that the type of clothing be a shirt as one purchase criterion in determining candidate purchases. Because the user is not interested in other clothing, decision engine 107 may treat the purchase criteria as a strict requirement. The user may also indicate that they are interested in shirts in the fifteen to twenty-five dollar range and the decision engine 107 may include a fifteen-to-twenty-five dollar price range as a purchase criterion in identifying candidate purchases. In certain embodiments, decision engine 107 may consider price as a guideline as opposed to a strict requirement and, as a result, may consider available products falling outside the specified price range as potential candidate purchases.

After decision engine 107 determines a list of candidate purchases, a final purchasing decision is made. Generally, a final purchasing decision is made by decision engine 107 and provided to user computing devices 102A-D in response to user input received from user computing devices 102A-D via an interactive module 116A-D operating as part of interactive decider 114. In simple interactive modules, the user input may correspond to a command to proceed with or initiate a decision-making process. In response to such a command, the decision engine 107 may select one of the candidate purchases as a final purchase decision and cause the final purchase decision to be presented to the user via the interactive decider 114. In certain embodiments, the decision engine 107 may make a final purchase decision before a user issues a command to proceed with the decision-making process such that issuing the command results only in presentation of the final purchase decision. In the embodiments having more complex interactive modules, such as those including games or simulations, inputs from user computing devices 102A-D may be transmitted to decision engine 107 and used during the decision-making process by decision engine 107 in determining a final purchase decision. For example, an interactive module may include a game that presents a plurality of candidate purchases to a user and gradually eliminates candidate purchases based on the user's performance during the game. Accordingly, the final purchase decision made by the decision engine 107 may take into account candidate purchases that were eliminated during the course of the game.

When the decision engine 107 makes a final purchase, the final purchase decision may be communicated to the interactive decider 114 and presented to a user of user computing devices 102A-D. The user is given the option to proceed with purchasing the final purchase decision. If the user decides to do so, interactive decider 114 may facilitate the purchase by populating an electronic shopping cart, navigating to a checkout page of the merchant's web site, inputting payment information into a payment form or taking similar steps towards completing the purchase. Once a purchase is finalized, merchant computing device 104 may communicate payment information to the payment processor 118 for authorization and completion of the purchase.

The architecture depicted in FIG. 1 is intended as merely an illustrative embodiment of systems in accordance with this disclosure. In other embodiments, any or all of the components depicted and their functionalities may be combined. For example, instead of including decision engine 107 in decision-making computing device 106, decision engine 107 and its functionalities may be incorporated into merchant computing device 104. Similarly, the functions of user computing devices 102A-D, merchant computing device 104, and decision-making computing device 106 may be incorporated into a single computing device. For example, a merchant may provide a standalone kiosk or similar computing device including means for a user to navigate products and services offered by the merchant, to input purchase criteria, and to receive final purchasing decisions.

Example Decision-Making Computing Device

Figure 2:
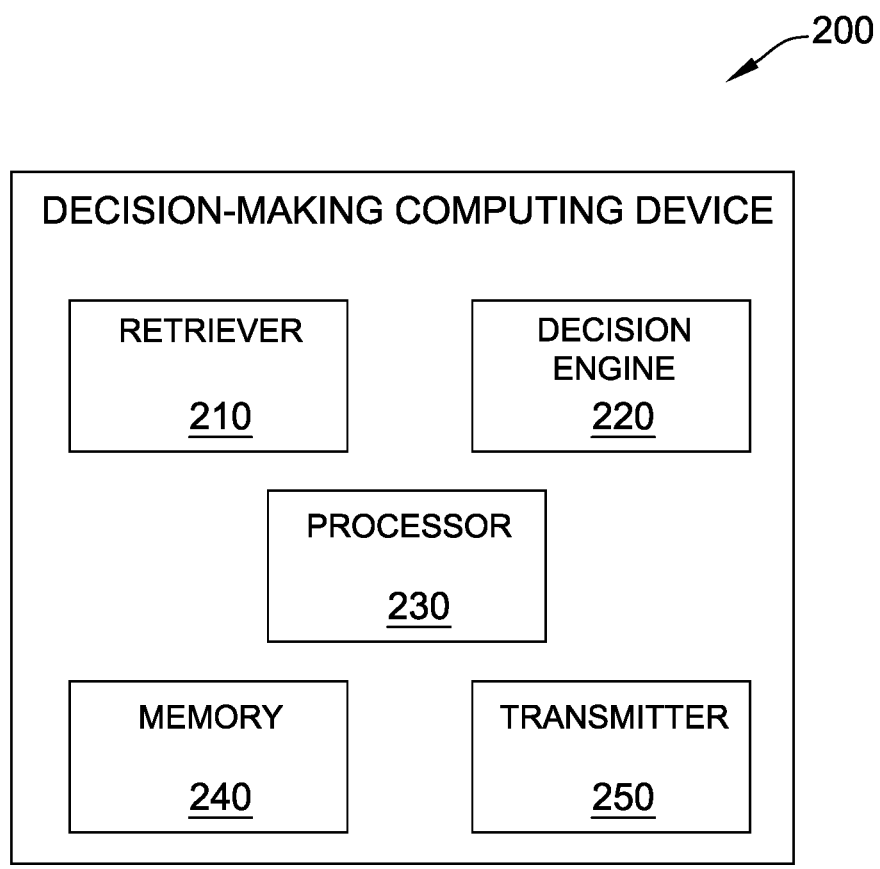
FIG. 2 is a block diagram of a decision-making computing device according to one embodiment disclosed herein.

FIG. 2 is a diagram illustrating an example embodiment of a decision-making computing device that may be included in the interactive travel analyzing system of FIG. 1, in accordance with an example embodiment of the present disclosure.

Decision-making computing device 200 may be coupled to or a part of the payment processor 118 of FIG. 1 or may be a separate computing device and may be connected to one or more of other computing devices via a network, such as first network 101 and second network 103 of FIG. 1. In this example, decision-making computing device 200 includes a retriever 210, a decision engine 220, a processor 230, a memory 240, and a transmitter 250. Decision-making computing device 200 may include additional components not shown, or less than the amount of components shown. Also, one or more of the components in this example may be combined or may be replaced by processor 230. The computer components described herein (e.g., retriever 210; decision engine 220; processor 230; memory 240; and transmitter 250) may include hardware and/or software that are specially configured or programmed to perform the steps described herein.

Retriever 210 is generally configured to obtain data necessary for generating a final purchase decision. Retriever 210 may obtain such data from a variety of sources including, but not limited to, (i) internal memory and databases maintained in decision-making computing device 200; (ii) websites, databases, and other data sources maintained remote from but accessible by decision-making computing device 200; (iii) user computing devices, including data stored within user computing devices and data transmitted by user computing devices; and (iv) merchant computing devices, including data stored within merchant computing devices and transmitted by merchant computing devices. In one example of a decision-making process, retriever 210 may retrieve data related to purchase criteria, data corresponding to available purchases, and user input captured by a user computing device during execution of an interactive module.

Data collected by retriever 210 may be processed and analyzed by decision engine 220 in order to generate a final purchase decision. For example, decision engine 220 may receive purchase criteria obtained by retriever 210, apply the purchase criteria to a list of available purchases obtained by retriever 210, and arrive at a final purchase decision based on user inputs received by retriever 210. To the extent retriever 210 obtains data related to purchase criteria as opposed to purchase criteria itself, decision engine 220 may derive purchase criteria from data related to purchase criteria. For example, if a user requests a decision regarding a movie ticket purchase, retriever 210 may obtain a list of favorite movies from a user's social media page and a list of actors in each movie of the list of movies from an Internet film database. Decision engine 220 may then perform a statistical analysis on the list of actors to derive a purchase criteria based on actors common to the user's favorite movies. In another example, a user may request a decision regarding a restaurant to dine at with a group of friends. In response, retriever 210 may first obtain a location from the user, for example, by retrieving geolocation data from a mobile device of the user or requesting the user to provide a preferred location. In certain embodiments, the user may also specify a radius from a specified location. For example, the user may specify that they are interested in restaurants within a five-mile radius of their current location. Retriever 210 may also obtain a minimum restaurant rating, which may be based on aggregated reviews and ratings by other diners, and mood of the group from the user. Ratings may be based on any system including, but not limited to, a number of star, a numerical rating, a thumbs up/thumbs down system, and the like. Retriever 210 may also obtain a mood of the group from the user. For example, the user may indicate that the group is feeling "happy", "excited", or "social". Retriever 210 may then apply purchase criteria based on the specific location, rating, and mood to a restaurant database accessible by retriever 210 and identify one or more candidate restaurants. For example, if a user indicates that they would like a restaurant within five miles that has been given a rating of three or more stars out of five, and that the user's group is feeling "social", the retriever 210 may retrieve candidate purchases consisting primarily of high rated bars, pubs, and other socially oriented establishments within a five-mile radius.

Decision engine 220 may also determine a list of candidate purchases from purchases available from a merchant. For example, retriever 210 may obtain a list of available purchases from a merchant computing device, such as merchant computing device 104 of FIG. 1. Decision engine 220 may then apply purchase criteria to the list of available purchases to determine candidate purchases that meet the purchase criteria. To do so, decision engine 220 may create filters, apply business rules, or perform other analysis of the available purchases based on the purchase criteria.

Decision engine 220 may also determine a final purchase decision from a list of candidate purchases. The process of determining a final purchase decision is dependent on various factors including, but not limited to, the number of candidate purchases, the nature of any interactive modules through which a user may provide user input, user input provided during execution of an interactive module, and the like. In certain instances, decision engine 220 may determine a final purchase decision independent of user input. For example, in some instances, only one candidate purchase may be available and, as a result, decision engine 220 may choose the candidate purchase as the final purchase decision. In other instances, decision engine 220 may determine a final purchase decision by randomly choosing a candidate purchase, choosing a candidate purchase that most closely meets the purchase criteria, choosing a candidate purchase that a merchant wishes to promote, and the like. Decision engine 220 may also determine a final purchase decision based, at least in part, on user input received from a user computing device. For example, decision engine 220 may determine a list of candidate purchases and, based on user input, choose or eliminate candidate purchases from the list until a final purchase decision is reached.

User input used by decision engine 220 may be provided via an interactive decider accessible to the user. The interactive decider may be incorporated into one or more of a merchant computing device, a user computing device, a decision-making computing device, and the like. For example, in certain embodiments, the interactive decider may be installed and run on a user computing device of the user. In other embodiments, the interactive decider may be incorporated into a website operated by a merchant and accessible via a web browser running on a user computing device of the user.

The interactive decider may enable gamification of the decision-making process. Gamification generally refers to the incorporation of interactive elements such as games, animations, videos, and the like into the decision-making process. In embodiments of interactive decision-making systems according to this disclosure, the decision-making process is gamified by including one or more interactive modules in the interactive decider. Each interactive module may be configured to accept input from a user and to present information relating to the decision-making process to the user. The degree of gamification and the level of complexity of interactive modules in accordance with this disclosure may vary.

In some embodiments of interactive modules, gamification may be relatively basic. For example, a user may be prompted to provide user input in the form of pressing a real or virtual button to initiate the decision-making process. The user input may be received by decision engine 220 which then determines a final purchase decision from the candidate purchases. In response to the user input, decision-making computing device 200 may also cause the interactive module of the interactive decider to play an animation.

In other embodiments of interactive modules, gamification may be more complex and require multiple actions, choices, and the like, on the part of the user. Such interactive modules may present the user with one or more of the candidate purchases and prompt the user to select one of the purchases by providing user input. For example, the user may provide user input in the form of a mouse click, a tap or swipe on a touchscreen, and the like to select one of the candidate purchases. Decision engine 220 may receive the user input, identify the selected candidate purchase, and eliminate the selected candidate purchase from those in consideration for the final purchase decision. This process may repeat until the user has eliminated all but one of the candidate purchases, which the decision engine 220 then selects as the final purchase decision.

A processor 230 may work in conjunction with any components of decision-making computing device 200 in order to facilitate the decision-making process. Processor 230 may perform a variety of functions including, but not limited to, coordinating decision-making, data transmission, and analysis functions; performing functions of decision engine 220 necessary to determine a final purchase decision such as determining purchase criteria, analyzing available purchases based on purchase criteria, or determining a final purchase decision; managing resources of the decision-making computing device; and other similar functions.

Decision-making computing device 200 may also include a memory 240. Memory 240 may be used to store decision-related data, including purchase criteria, information regarding available and candidate purchases, and the like. Memory 240 may also store user information, including but not limited to, purchase card information, purchase histories, and previous rejections or acceptances of a final purchase decision by the user. Memory 240 may be accessed by decision engine 220, processor 230, or any other component of decision-making computing device 200 to facilitate the decision-making process. Memory 240 may be local to decision-making computing device 200 or may be remote but otherwise accessible to decision-making computing device 200.

Decision-making computing device 200 may further include a transmitter 250 configured to transmit data from decision-making computing device 200 to other devices communicatively coupled to decision-making computing device 200. Such devices may include a merchant computing device, a user computing device, a remote data source, and a payment processor such merchant computing device 104, user computing devices 102A-D, remote data source 108, and a payment processor 118 of FIG. 1. Data transmitted by transmitter 250 may include decision-related data, requests for decision-related data, and the like.

In certain embodiments, decision-making computing device 200 may be further configured to initiate a purchase of a final purchase decision. Initiation of a purchase may occur after a user confirms that they would like to proceed with purchasing a final purchase decision generated by decision-making computing device 200. Initiating a purchase may include any steps in furtherance of completing the purchase. Such steps may include any of issuing a command to a user computing device to navigate to a payment or checkout webpage, populating an electronic shopping cart of a merchant website with the final purchase decision, inserting a payment method or payment information of the user into a form, and transmitting purchase information to a payment processor.

Example Method of Interactive Decision-Making

Figure 3:
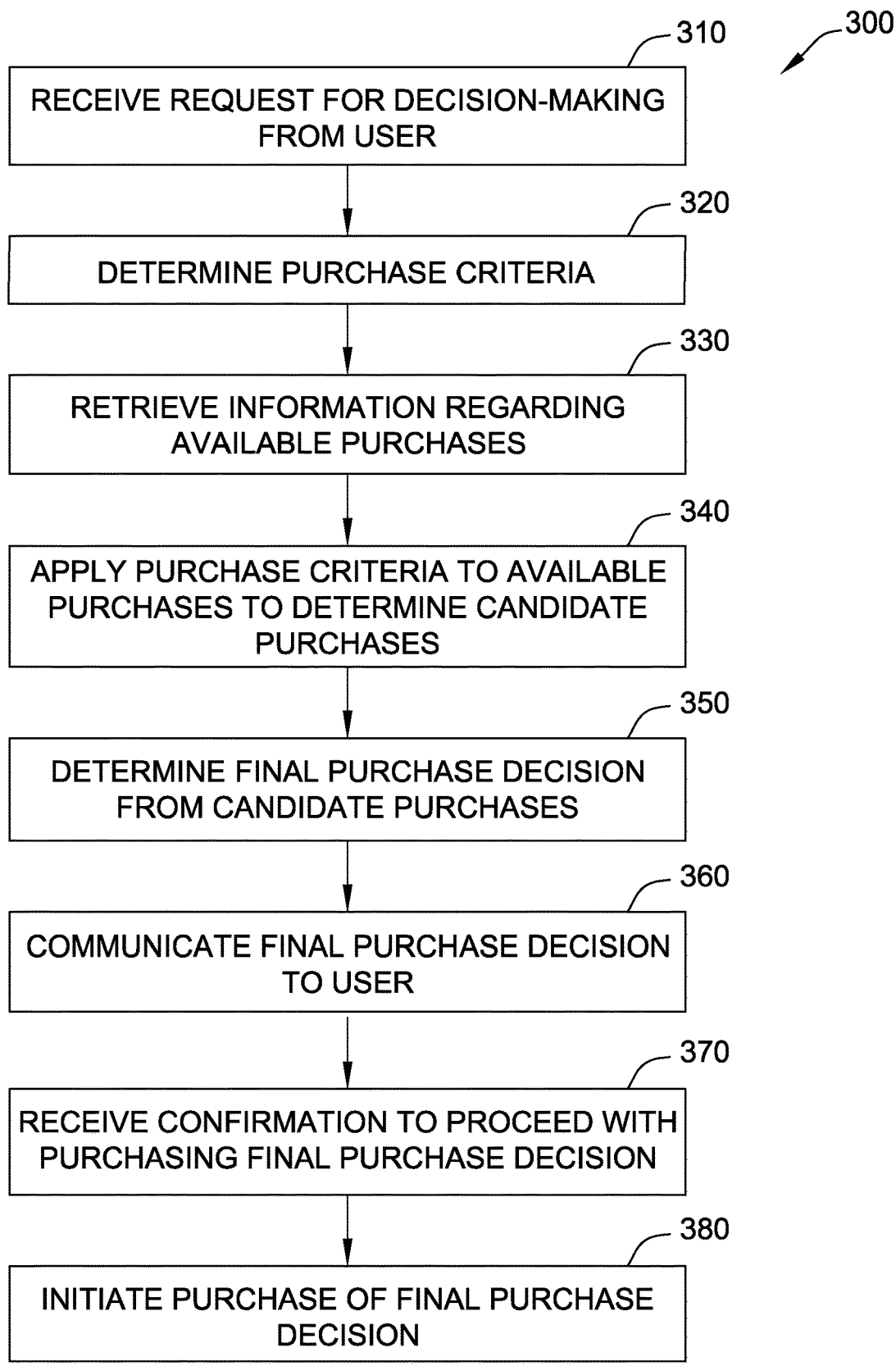
FIG. 3 is a flow chart illustrating a method of intern decision-making according to one embodiment disclosed herein.

FIG. 3 depicts an example method for interactive decision-making 300 as executed by an interactive decision-making system in accordance with this disclosure, such as interactive decision-making system 100 of FIG. 1.

At step 310, a decision-making computing device, such as decision-making computing device 200 of FIG. 2 receives a request to initiate a decision-making process. The request to initiate the decision-making process may be generated in response to a user providing input to a user computing device indicating that the user would like to make a purchasing decision. For example, in certain embodiments, a user may be navigating a merchant website with a user computing device and click a button, link, or other control of the website configured to initiate the decision-making process. In other embodiments, the user may open a mobile application or other program installed on the user computing device to generate a request to initiate the decision-making process.

After the decision-making computing device receives a request to initiate a decision-making process, the decision-making computing device determines purchase criteria 320.

Purchase criteria may be context-specific and may vary significantly based on the products and services offered by a merchant. For example, if a merchant offers a wide range of goods and services, purchase criteria may be relatively broad and include general purchase categories such as merchandise, clothing, entertainment (concert tickets, movies, music, theater tickets, sporting events, etc.), food, travel, health and beauty treatments, and the like. If a merchant's offerings are more limited, purchase criteria may be more granular. In the context of a clothing merchant, for example, purchase criteria may include not only a general type of clothing (hat, shirt, dress, pants, etc.), but also more specific details such as price, color, size, style, material, a text or design on the clothing, and the like.

In certain embodiments, a user may provide purchase criteria as part of the decision-making process. A user may use a merchant's website, a mobile application, or other software to select, input, or otherwise identify purchase criteria that are then sent to the decision-making computing device. For example, a merchant's website or a mobile application may include a user interface including one or more of checkboxes, sliders, drop-down menus, input boxes, and the like for a user to input purchase criteria.

The decision-making computing device may also determine purchase criteria from personal information of the user. In certain embodiments, the decision-making computing device may access a user's social media account or similar source of personal information. Based on the personal information, the decision-making computing device may create purchase criteria to be used in the decision-making process. For example, a user's social media page may include lists of the user's favorite movies, TV shows, books, actors, and the like. Accordingly, if the user requests that a decision regarding a movie ticket purchase be made, the decision-making computing device may retrieve the movie-related information from the user's social media account and use the information to develop purchase criteria.

The decision-making computing device may also develop purchase criteria based on a user's purchasing history. To do so, the decision-making computing device may have access to a user's credit or other payment card account history and may be able to analyze past purchasing activity to determine trends and preferences of the user. For example, a user's purchase history may indicate that a user predominantly eats at Mexican and Italian restaurants. Accordingly, if the user requests a decision regarding a restaurant reservation or take-out order, the decision-making computing device may develop purchase criteria favoring Mexican and Italian restaurants.

The decision-making computing device may also use historical feedback provided by the user to develop purchase criteria. As previously discussed, the decision-making computing device generally presents a final purchasing decision to the user which the user may confirm and proceed to purchase. In certain embodiments, the interactive decision-making computing may track characteristics of final purchasing decisions that are accepted and/or rejected and derive purchase criteria therefrom. Similarly, if a user confirms and purchases a final purchase decision, the decision-making computing device may request a rating or similar feedback regarding the user's satisfaction with the final purchase decision. The decision-making computing device may then use such feedback to develop purchase criteria for future decision-making processes.

In certain embodiments, the decision-making computing device may develop purchase criteria based on a profile or account associated with the user. The user may, as part of the account, specify and save default values or criteria for retrieval and use by the decision-making computing device. For example, a user may, through an app or website, specify and save certain preferences or default values in his or her account for certain types of decisions. The decision-making computing device may, provided contrary criteria are not provided by the user, apply the default settings as purchase criteria in addition to any other purchase criteria that may be specified by the user. For example, a user may specify as part of their account that any decisions related to restaurants be limited to establishments within ten miles of the user's current position.

The decision-making computing device may also develop purchase criteria from data other than that provided by or directly attributable to the user initiating the decision-making process. Such data sources may include but is not limited to, websites, external databases, and the like. For example, the decision-making computing device may retrieve data from websites containing reviews or ratings related to the purchasing decision and develop purchase criteria based on the reviews or ratings. So, if a user is trying to determine a movie to attend, the decision-making computing device may retrieve ratings from film critic websites, film review websites, or other websites containing third-party feedback and develop purchase criteria based on such feedback. Similarly, the decision-making computing device may also retrieve data from consumer ratings agencies or reports, government reports, and other materials including ratings related to reliability, quality, safety, and the like in order to develop purchase criteria.

The decision-making computing device may also develop purchase criteria from users of the interactive decision-making system other than the user who initiated the decision-making process. For example, a group of people may contain two or more users of the interactive decision-making system. An initiating user may initiate a decision-making process and, as part of the decision-making process, identify other users of the interactive decision-making system. The decision-making computing device may then determine purchase criteria based on data related to the other users.

The decision-making computing device may also determine purchase criteria based on data retrieved from a merchant. Such data may be retrieved from a merchant computing device such as merchant computing device 104 of FIG. 1. Merchants may wish to influence or otherwise direct final purchase decisions generated by interactive decision-making systems in accordance with this disclosure to favor particular purchases offered by the merchant. Such steering of the decision-making process may be useful for merchants attempting to reduce excess inventory of particular purchases, to sell purchases that are going out of season or discontinued, to promote particular purchases, or to sell items such as concert or sporting event tickets that are inherently time-limited. Accordingly, decision-making computing devices may retrieve data or purchase criteria from a merchant reflecting the merchant's preferences as to final purchase decisions.

In addition to determining purchase criteria, the decision-making computing device retrieves information regarding available purchases 330. Such information may be retrieved by decision-making computing device from a merchant computing device, such as merchant computing device 104 of FIG. 4.

The term "available purchases", as used herein, generally refers to purchases that may be made through a merchant. Available purchases may include all goods and/or services that may be purchased through a merchant or may include only a subset of goods and/or services relevant to a particular decision-making process. Determining whether goods and/or services are relevant to a particular decision-making process may be done in various ways. In certain embodiments, a user may directly indicate particular categories of goods or services in which the user is interested before or after initiating the decision-making process. In other embodiments, the categories of goods or services may be implied from actions of the user. For example, prior to initiating the decision-making process, a user may navigate to one or more webpages corresponding to goods or services offered by a merchant. When the user then initiates the decision-making process, characteristics of the goods or services viewed by the user may be used to identify a subset of goods and services available from the merchant to be considered as available purchases.

After the decision-making computing device determines purchase criteria and information regarding available purchases, the decision-making computing device may determine a set of candidate purchases by applying the purchase criteria to the information regarding the available purchases 340. Doing so may entail generating and applying one or more filters based on the purchase criteria, running rules based on the purchase criteria, or otherwise determining which available purchases substantially meet the purchase criteria.

The number of candidate purchases to be identified by the decision-making computing device may depend on the number of available purchases from which candidate purchases may be chosen. The number of candidate purchases may also be dictated by the number of candidate purchases required for a particular interactive module of an interactive decider, as explained below in more detail.

If the decision-making computing device determines that the number of available purchases meeting the purchase criteria exceeds the maximum number of candidate purchases permitted for a given decision, a subset of the available purchases meeting the purchase criteria may be chosen as candidate purchases. To do so, the interactive decision-making tool may randomly select candidate purchases from the available purchases meeting the purchase criteria, rank or score the available purchases meeting the purchase criteria and select the best available purchases that meet the purchase criteria as the candidate purchases, prompt the user to select one or more of the available purchases meeting the product criteria as candidate purchases, determine additional purchase criteria, or make the existing purchase criteria more stringent.

If the decision-making computing device identifies fewer than the maximum permissible number of candidate purchases the decision-making computing device may proceed with the decision-making process or may modify purchase criteria (for example, by broadening or eliminating certain criteria) in order to determine the requisite number of candidate purchases. If the decision-making computing device does not identify any candidate purchases, the decision-making computing device may abort the decision-making process or modify the purchase criteria. Purchase criteria may be modified automatically by the decision-making computing device or may in response to input received from a user. In the case of automatic modification, the decision-making computing device may eliminate or broaden certain purchase criteria to increase the likelihood that available purchases will meet the modified purchase criteria. For example, if the purchase criteria include minimum and maximum purchase prices, the decision-making computing device may modify the purchase criteria by decreasing the minimum purchase price and/or increasing the maximum purchase price. In the case of modification involving user input, the decision-making computing device may notify a user that no candidate purchases or an insufficient number of candidate purchases were identified and request the user to select one or more purchase criteria to remove or modify.

In certain embodiments, the decision-making computing device may apply weights to, generate scores for, or otherwise rank the available purchases meeting the purchase criteria and select the highest ranking available purchases meeting the purchase criteria as the candidate purchases. Ranking of an available purchase may be based on the quantity of purchase criteria satisfied by the available purchase, how closely the available purchase satisfies purchase criteria, and the like. For example, if there are two or more purchases that generally meet all purchase criteria but differ in price, the decision-making computing device may rank the available purchase having a lower price better than the available purchase having a higher price. Ranking may also be performed in whole or in part based on user preferences. For example, a user may indicate which product criteria should be given more or less importance when determining candidate purchases. Similar to purchase criteria, ranking may also be based on a user's personal information including information available on a user's social media site, the user's purchasing history, prior feedback provided by the user regarding prior purchases, and the like. For example, if a user is looking to purchase new music, the decision-making computing device may determine a user's favorite bands and their respective music genres. To the extent the user's favorite bands fall predominantly in one genre of music, available purchases that fall into that genre of music may be given greater weight in determining whether to select the available purchases as candidate purchases. Rankings may also be based on sources such as websites or databases unassociated with the user. For example, the decision-making computing may rank available purchases based on reviews or ratings available through a website or on rankings provided by the merchant offering the available purchases.

Determining candidate purchases may also include retrieving and analyzing historic data from other users. Such data may include how often an available purchase was purchased or declined by users and any ratings or feedback provided by other users when accepting or declining the purchase. Based on this information, the decision-making computing device may determine which purchases are most popular and/or most often sold and rank the available purchases accordingly.

In certain embodiments, determining candidate purchases may be a multi-stage process in which the number of candidate purchases to consider in determining a final purchase decision is successively narrowed. For example, as discussed below in more detail, the decision-making computing device may determine a first list of candidate purchases and, based on user input received through an interactive module of an interactive decider, reduce the first list to a smaller list of candidate purchases.

After the decision-making computing device identifies a list of candidate purchases, it determines a final purchase decision from the candidate purchases 350 and communicates the final purchase decision to the user 360. To facilitate the process of determining a final purchase decision, interactive decision-making systems in accordance with this disclosure include an interactive decider having one or more interactive modules. The interactive decider is generally an interface between a user and the decision-making computing device that transmits user input to the decision-making computing device and presents decision-related data received from the decision-making computing device to the user via a user computing device.

Interactive deciders may include one or more interactive modules configured to present the decision-making process to the user in the form of a game, animation, video, activity, and the like. The interactive modules may take various forms and are not limited to any specific examples provided herein. In embodiments in which the interactive decider includes more than one interactive module, a particular module may be selected based on one or more of the number of candidate purchases, user preferences or input, merchant preferences or input, and the like. For example, the interactive decider may randomly select one of the interactive modules or may select an interactive module based on user input.

In the embodiments having relatively simple interactive modules, interaction with a user may be limited to receiving input to initiate the decision-making process. Once such input is received and communicated to the decision-making computing device, the decision-making computing device may perform the decision-making process and present the final purchase decision to the user via the interactive decider. For example, an interactive module may present a "DECIDE" button to a user via a user interface of a user computing device. When the "DECIDE" button is pressed or clicked by the user, the event is communicated to the decision-making computing device, which selects one of the candidate purchases as a final purchase decision. Also, the interactive module may be configured display an animation of a coin flip, dice roll, wheel spin, card draw, and the like when the "DECIDE" button is pressed. After a final purchase decision is made by the decision-making computing device, the decision-making computing device may communicate the final purchase to the interactive decider which presents the final purchase decision to the user via the user interface. Selection of the final purchase decision by the decision-making computing device may occur in various ways. In certain embodiments, the decision-making computing device may randomly select one of the candidate purchases as the final purchase decision. In other embodiments, the decision-making computing device may rank the candidate purchases based on how well they fit the purchase criteria and select the candidate purchase that best fits the purchase criteria as the final purchase decision.

In other interactive modules, the decision-making computing device may select a subset of candidate purchases to be used in an interactive module. During execution of the interactive module, a user may provide input to select or eliminate candidate purchases of the subset of candidate purchases until one candidate purchase is selected as a final purchase decision. As part of the interactive module, the subset of candidate purchases may be hidden from the user until the final purchase decision is made. Once a selection is made, the final purchase decision is revealed. One example of such an interactive module may include presenting the user with two or more face-down cards corresponding to each of the subset of candidate purchases. The user may be prompted by the interactive module to select one of the cards. A card flipping animation may then be played by the interactive module, revealing the final purchase decision. Another example of an interactive module may include presenting the user with a game in which two or more suitcases corresponding to candidate purchases are presented to the user for selection. Once a suitcase is selected, an animation may play in which one of the non-selected suitcase is opened to reveal the candidate purchase corresponding to the opened suitcase. The user may then be given the option of keeping their chosen suitcase or choosing another still unopened suitcase. After all suitcases have been eliminated, the candidate purchase corresponding to the remaining suitcase chosen by the user may be revealed as the final purchase decision.

Interactive modules may be themed according to the type of purchase being made. For example, if a user is deciding on a destination for travel, an interactive module may include a globe that the user spins to determine a travel destination. As another example, if the user is deciding on a music album to purchase, the interactive module may include a jukebox that shuffles records representing the candidate purchases before selecting and playing the album corresponding to the final purchase decision.

To add additional entertainment value to interactive decision-making systems in accordance with this disclosure, the manner in which a user interacts with an interactive module may vary. The interactive decider may receive user input from sensors, accelerometers, cameras, touchscreens, keyboards, and other input methods commonly available in smartphones and other user computing devices. For example, the interactive decider may take the form of a simulated "magic 8-ball" operated on a smartphone having an accelerometer capable of detecting movement of the smartphone. Physical magic 8-balls are generally used by flipping the magic 8-ball, shaking the magic 8-ball, and then turning the magic 8-ball back over to reveal a fortune or other outcome. Similarly, an interactive decider based on a simulated magic 8-ball may require a user of a smartphone to flip their smartphone, shake their smartphone, and then flip the smartphone back over to reveal a final purchase decision.

After the decision-making computing device determines a final purchase decision and the final purchase decision is presented to the user, the user may choose to confirm or reject the final purchase decision. If the user rejects the final purchase decision, the decision-making computing device may take various remedial actions including aborting the decision-making process, selecting an alternate candidate purchase as a new final purchase decision, identifying a new set of candidate purchases and selecting a new final purchase decision from the new set of candidate purchases, and the like. In certain embodiments, the decision-making computing device may automatically select an alternate candidate purchase as a second final purchase decision and present the second final purchase decision to the user for confirmation. The decision-making computing device may also reinitiate the decision-making process or rerun the decision-making process from any point. For example, in some instances, the decision-making computing device may cause an interactive module to be rerun with the possibility of selecting a new final purchase decision. In other instances, the decision-making computing device may determine one or more of new purchase criteria, new available purchases, and new candidate purchases, as described herein.

As previously noted, decision-making computing devices may calculate or determine ranks, scores, weights, and other metrics representing how closely a candidate purchase meets purchase criteria. In addition to differentiating candidate purchases from each other, such metrics may also be presented to a user to indicate the confidence of the decision-making computing device that candidate purchases or final purchase decisions will satisfy the user. In certain embodiments, the confidence metric for a candidate purchase or final purchase decision may be visually indicated by size, color, text, and the like. For example, an interactive module may include a textual phrase stating "We are X % confident that you will love this product!" when presenting a final purchase decision, where "X" represents a percentage of purchase criteria met by the final purchase decision. In other embodiments, interactive modules in which elements represent candidate purchases may use confidence metrics to dictate behavior or appearance of certain candidate purchases. For example, if a virtual ball is used in an interactive module to represent a candidate purchase, the ball may be larger or behave as if it was heavier than balls representing candidate purchases having lower confidence metrics.

A user who wishes to proceed with purchasing the final purchase decision may do so by providing confirmation to the interactive decider. The confirmation is then received by the decision-making computing device 370. In response to receiving a confirmation, the decision-making computing device may initiate a purchase of the final purchase decision 380. Initiating the purchase of the final purchase decision generally includes taking any steps towards completing a purchase of the final purchase decision. In certain embodiments, the decision-making computing device may transmit a command to the user computing device of the user causing the user computing device to automatically open an application or navigate to a website with which the user may complete his or her purchase. The decision-making computing device may also transmit data or commands to add the final purchase decision to an electronic shopping cart or similar electronic checkout mechanism. If the decision-making computing device has access to payment or personal information of a user, the decision-making computing device may also automatically populate an electronic purchase form with the user's payment or personal information.

Additional Considerations

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for recommending merchants at a travel destination to a cardholder. In this example, the computing device may include a memory device and a processor in communication with the memory device, and when executed by said processor, the computer-executable instructions may cause the processor to perform a method, such as the method described and illustrated in the example of FIG. 5.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A decision-making computing device for facilitating a purchasing decision by a user of a user computing device, the decision-making computing device comprising a decision engine and an interactive decider, the decision-making computing device in communication with the user computing device and one or more memory devices, the decision-making computing device configured to:
   receive, from an application executing on the user computing device, a request to initiate a decision-making process;
   determine one or more purchase criteria corresponding to characteristics of the purchasing decision;
   retrieve, via communication with a plug-in module executing on a merchant computing device, available purchase information corresponding to one or more purchases available from a merchant associated with the merchant computing device;
   apply the purchase criteria to the available purchase information to determine a plurality of candidate purchases;
   cause, by the interactive decider of the decision-making computing device, the application executing on the user computing device to display an interactive module configured to enable user interaction with the decision-making computing device;
   in response to a user input communicated by the application executing on the user computing device via the interactive module, initiate a decision-making process;
   further in response to the user input, (i) cause the application executing on the user computing device to display, via the interactive module, a gamified representation of the decision-making process, wherein the gamified representation includes an animation configured to engage the user in the decision-making process, and wherein the plurality of candidate purchases are withheld from being displayed to the user and (ii) determine, using the decision engine of the decision-making computing device, a final purchase decision from among the plurality of candidate purchases, wherein the final purchase decision is determined independently of the gamified representation;
   cause, by the interactive module, the final purchase decision to be displayed on the application executing on the user computing device as an element of the animation, such that the final purchase decision appears to be an outcome of the gamified representation of the decision-making process;
   receive, from the application executing on the user computing device via the interactive module, a confirmation to initiate a purchase of the final purchase decision; and
   initiate, in response to receiving the confirmation, the purchase of the final purchase decision.

2. The decision-making computing device of claim 1, wherein the gamified representation of the decision-making process further includes one or more of an interactive game, a video, and a simulation.

3. The decision-making computing device of claim 1 further configured to obtain the purchase criteria from one or more of (i) the user; (ii) a merchant computing device; (iii) one or more second users; (iv) historical purchases by the user; (v) historical purchases of the second users; (vi) a social media account of the user; (vii) one or more social media accounts of the second users; and (viii) a review website.

4. The decision-making computing device of claim 1 further configured to initiate the purchase of the final purchase decision further by one or more of (i) issuing a command that, when received by the user computing device, causes the user computing device to navigate to a purchase website; (ii) issuing a command that, when received by the user computing device, causes the user computing device to open a program from which the purchase may be made; (iii) populating an electronic shopping cart with the final purchase decision; and (iv) populating an electronic form with user information.

5. A computer-implemented method for facilitating a purchasing decision by a user of a user computing device, said method implemented using a decision-making computing device including a decision engine and an interactive decider, the decision-making computing device in communication with the user computing device and one or more memory devices, said method comprising:

receiving, by the decision-making computing device, from an application executing on the user computing device, a request to initiate a decision-making process;

determining, by the decision-making computing device, one or more purchase criteria corresponding to characteristics of the purchasing decision;

retrieving, by the decision-making computing device, via communication with a plug-in module executing on a merchant computing device, available purchase information corresponding to one or more purchases available from a merchant associated with the merchant computing device;

applying the purchase criteria to the available purchase information to determine a plurality of candidate purchases;

causing, by the interactive decider of the decision-making computing device, the application executing on the user computing device to display an interactive module configured to enable user interaction with the decision-making computing device;

in response to a user input communicated by the application executing on the user computing device via the interactive module, initiating a decision-making process;

further in response to the user input, (i) causing the application executing on the user computing device to display, via the interactive module, a gamified representation of the decision-making process, wherein the gamified representation includes an animation configured to engage the user in the decision-making process by presenting a plurality of symbols corresponding to the plurality of candidate purchases, wherein the plurality of candidate purchases are withheld from being displayed to the user, (ii) receiving a user selection of one or more of the plurality of symbols, and (iii) determining, using the decision engine of the decision-making computing device, a final purchase decision from among the plurality of candidate purchases, wherein the final purchase decision is based, at least in part, on the received user selection;

causing, by the interactive module, the final purchase decision to be displayed on the application executing on the user computing device as an element of the animation, such that the final purchase decision appears to be an outcome of the gamified representation of the decision-making process;

receiving, from the application executing on the user computing device via the interactive module, a confirmation to initiate a purchase of the final purchase decision; and initiating, in response to receiving the confirmation, the purchase of the final purchase decision.

6. The method of claim 5, wherein the gamified representation of the decision-making process further includes one or more of an interactive game, a video, and a simulation.

7. The method of claim 5, wherein the purchase criteria are obtained from one or more of (i) the user; (ii) a merchant computing device; (iii) one or more second users; (iv) historical purchases by the user; (v) historical purchases of the second users; (vi) a social media account of the user; (vii) one or more social media accounts of the second users, and (viii) a review website.

8. The method of claim 5, wherein initiating the purchase of the final purchase decision further comprises one or more of (i) issuing a command that, when received by the user computing device, causes the user computing device to navigate to a purchase website; (ii) issuing a command that, when received by the user computing device, causes the user computing device to open a program from which the purchase may be made; (iii) populating an electronic shopping cart with the final purchase decision; and (iv) populating an electronic form with user information.

9. A non-transitory computer-readable storage media having computer-executable instructions embodied thereon for implementing a decision engine and an interactive decider on a decision-making computing device, wherein when executed by at least one processor of the decision-making computing device, the computer-executable instructions cause the at least one processor to:

receive, from an application executing on a user computing device associated with a user, a request to initiate a decision-making process corresponding to a purchasing decision;

determine one or more purchase criteria corresponding to characteristics of the purchasing decision;

retrieve, via communication with a plug-in module executing on a merchant computing device, available purchase information corresponding to one or more purchases available from a merchant associated with the merchant computing device;

apply the purchase criteria to the available purchase information to determine a plurality of candidate purchases;

cause, by the interactive decider of the decision-making computing device, the application executing on the user computing device to display an interactive module configured to enable user interaction with the decision-making computing device;

in response to a user input communicated by the application executing on the user computing device via the interactive module, initiate a decision-making process;

further in response to the user input, (i) cause the application executing on the user computing device to display, via the interactive module, a gamified representation of the decision-making process, wherein the gamified representation includes an animation configured to engage the user in the decision-making process, and wherein the plurality of candidate purchases are withheld from being displayed to the user and (ii) determine, using the decision engine of the decision-making computing device, a final purchase decision from among the plurality of candidate purchases, wherein the final purchase decision is determined independently of the gamified representation;

cause, by the interactive module, the final purchase decision to be displayed on the application executing on the user computing device as an element of the animation, such that the final purchase decision appears to be an outcome of the gamified representation of the decision-making process;

receive, from the application executing on the user computing device via the interactive module, a confirmation to initiate a purchase of the final purchase decision; and initiate, in response to receiving the confirmation, the purchase of the final purchase decision.

10. The computer-readable storage media in accordance with claim 9, wherein the gamified representation of the decision-making process further includes one or more of an interactive game, a video, and a simulation.

11. The computer-readable storage media in accordance with claim 9, wherein the computer-executable instructions cause the at least one processor to obtain the one or more purchase criteria includes obtaining the purchase criteria from one or more of the user, a merchant computing device, one or more second users, historical purchases by the user, historical purchases of the second users, a social media account of the user, one or more social media accounts of the second users, and a review website.

12. The computer-readable storage media in accordance with claim 9, wherein the computer-executable instructions cause the at least one processor to initiate the purchase of the final purchase decision further by one or more of (i) issuing a command that, when received by the user computing device, causes the user computing device to navigate to a purchase website; (ii) issuing a command that, when received by the user computing device, causes the user computing device to open a program from which the purchase may be made; (iii) populating an electronic shopping cart with the final purchase decision; and (iv) populating an electronic form with user information.

* * * * *